May 29, 1934.  C. R. MORRISON  1,960,751
DIAL TEST INDICATOR ATTACHMENT
Filed June 8, 1931
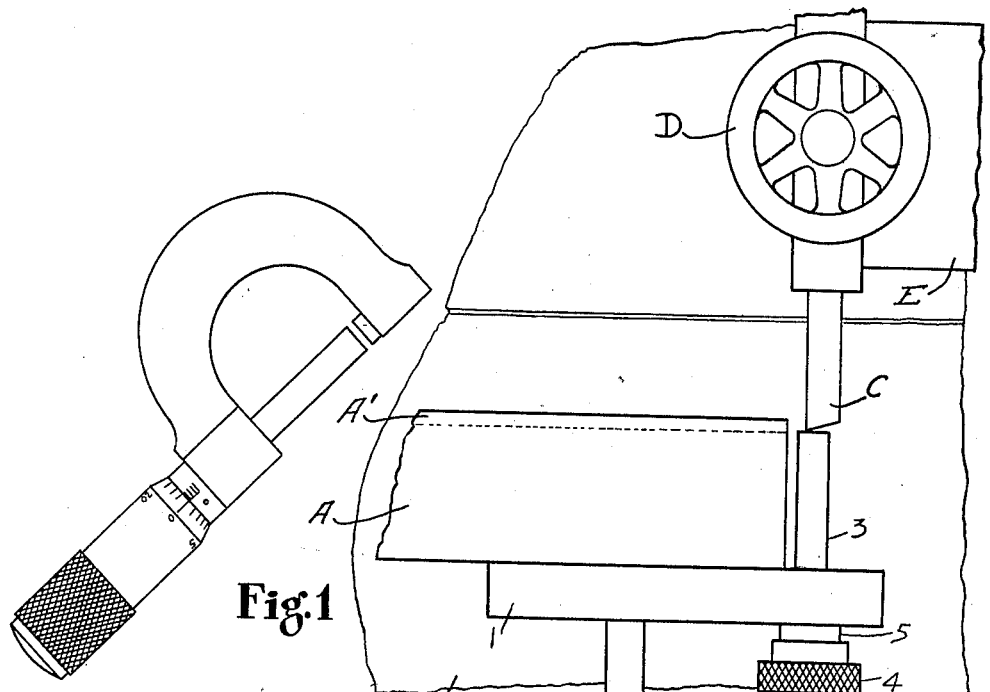
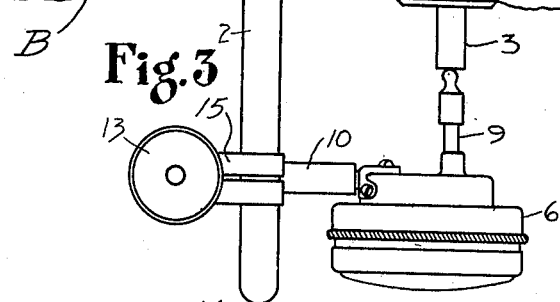
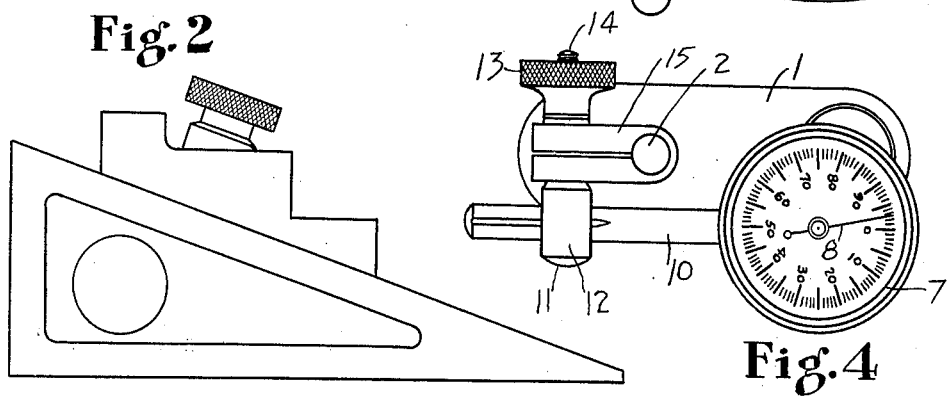
INVENTOR.
Charles·R·Morrison
BY 
ATTORNEYS.

Patented May 29, 1934

1,960,751

UNITED STATES PATENT OFFICE 1,960,751

DIAL TEST INDICATOR ATTACHMENT

Charles R. Morrison, Cleveland, Ohio

Application June 8, 1931, Serial No. 542,821

4 Claims. (Cl. 33—172)

This invention relates to an improved form of attachment for use in connection with a dial test indicator.

As is well known to those who are familiar with the art to which the present invention relates, it is common practice in the use of lathes, planers, shapers, and other trimming machines to measure the work from time to time during the trimming operation so as to thereby ascertain when the work has been reduced to the width or thickness or other measurement desired. It is also well known that it is practically impossible to set the cutting tool of the trimming machine in sufficiently accurate manner so as to obtain the exact measurement desired without further testing and trimming. This process obviously entails the expenditure of a great deal of time and care and as a result, there is the tendency upon the part of the mechanic to sacrifice the accuracy which might be required especially in certain classes of work in which the highest degree of accuracy is required.

Accordingly, it is the object of the present invention to devise an attachment which may be employed in connection with a dial test indicator so as to enable the operator to set the cutting tool in a convenient manner and with exact precision so as to ensure the obtaining of the exact measurement desired upon the finished work.

A further object is to devise such an attachment which is of comparatively simple construction and which may be conveniently applied so as to afford the operator a visible reading of the indicator and to thereby indicate exactly the setting of the tool at the proper point for the desired degree of cutting.

Another object consists in devising such an attachment which may be employed for various purposes in connection with this class of work as, for instance, in the setting of tools for the trimming of work to the desired width, depth, or height and also for use by inspectors in the examination of work.

Other objects will appear from the following description and claims when considered together with the accompanying drawing.

Fig. 1 illustrates a micrometer caliper which is employed as a preliminary step in the setting of the present device; Fig. 2 illustrates a planer and shaper gauge which is also employed as a preliminary step; Fig. 3 is a plan view and indicates in a general way the manner of using the present improved form of attachment; and Fig. 4 is an end view of the same.

It is to be understood that the present disclosure is merely for purposes of illustration and that other variations and modifications may be made without departing from the spirit of the present invention as herein set forth and claimed.

According to the present invention, the micrometer caliper is set for the exact measurement which it is desired to obtain upon the finished work. Then with the micrometer caliper set in such position, it is applied to the planer and shaper gauge so as to transfer such exact measurement thereto, the planer and shaper gauge being adjusted accordingly and then securely set in such position. Both the micrometer caliper and the planer and shaper gauge are old and well known in the art and no novelty is claimed in this connection in the present case except insofar as they are employed in the performance of preliminary steps in the method of practising the present invention.

The applicant's improved attachment is then applied to the planer and shaper gauge while it occupies position upon a substantial base and in this way, the measurement which was in the first place set upon the micrometer caliper and then upon the planer and shaper gauge will be transferred to the present improved form of attachment for the dial test indicator. Then as will later appear, the cutting tool will be set by means of the present attachment which has been set according to the predetermined desired measurement in the manner just indicated.

The attachment proper comprises the base portion 1 and the post 2 which is securely fixed thereto. The post 2 is located near the one end of the base 1 while near the other end of the base there is provided an opening therethrough for the gauge pin 3. There will be provided a set of gauge pins 3 of various lengths so that the present attachment may be readily employed for the setting of the tool so as to produce various measurements. The pin 3 may be secured in set position by means of the nut 4 which engages the clamping split collar 5 which extends from the base 1 around the opening through which the pin 3 extends. As will later appear, the distance which the pin 3 extends from the opposite face of the base 1 indicates the exact measurement desired for the finished work. The manner of transferring this measurement to the cutting tool so as to set the tool in proper position will now be explained.

The post 2 is adapted for mounting thereupon the dial test indicator which in itself is old and well known to those who are familiar with the present art. This indicator comprises the casing 6 in which is arranged the dial 7 and the hand 8 which is actuated by means of a spring-controlled pin 9 which has operative connection with the hand 8 and which extends out through the base of the casing 6. The casing 6 is provided with the supporting arm 10 which extends through a diametrically disposed opening through the bracket arm 11. Cooperating with the bracket arm 11 is the outer concentrically arranged collar 12 having diametrically disposed openings through which the arm 10 also extends and which is adapted to be clamped thereagainst by means of the nut 13 which engages the threaded end 14 of the bracket arm 11 and which is adapted to be clamped against the split collar 15 which in turn surrounds the post 2 and is adapted to be clamped in set position thereupon. Thus, the nut 13 serves the double purpose of clamping the arm 10 in the bracket 11 and at the same time clamping the entire indicator in the desired position upon the post 2.

The parts above referred to are so constructed and arranged with respect to the present improved attachment that the movable member 9 will occupy position in registry with the opening through the base 1, or in other words, in registry with the pin 3 which extends therethrough and the dial test indicator will be adjusted upon the post 2 so that the extension 9 may rest with tension upon the end of the gauge pin 3.

Then with the pin 3 clamped in set position so as to correspond to the desired measurement which has been transferred thereto in the manner above explained and while the gauge pin is still clamped by the nut 4 in such position, the nut 13 is released so as to permit the dial test indicator to be adjusted along the post 2 so as to place the projection 9 under tension by engagement upon the end of the fixed gauge pin 3. Such tension may be of any degree desired, as for instance, that corresponding to fifty one-thousandths upon the dial of the indicator, and the nut 13 is then tightened so as to secure the indicator in such position with the projection 9 under tension. Then with the parts in such condition, the dial is turned so as to bring the hand to zero. Then the nut which clamps the gauge pin in set position is released so as to permit the gauge pin to be moved against the projection 9 during the operation of setting the cutting tool.

Then with the piece of work A in position upon the bed B of the planer, lathe, or other trimming machine, this device is applied to the rear side of the work with the face of the base portion lying thereagainst and with the gauge pin 3 extending beyond the end of the work so as to be engaged by the cutting tool C. With the parts in such position, the cutting tool is then adjusted by means of the familiar wheel D which will move the tool carriage E toward the pin 3 until the cutting tool, as it engages the end of the gauge pin, will cause the hand 8 of the indicator to return to zero upon the dial. It is to be understood that after the projection 9 was placed under tension and the gauge pin 3 later released, the hand 8 moved a distance upon the dial corresponding to the degree of tension under which the projection 9 was placed. It is to this extent that the gauge pin 3 is projected through the attachment in excess of the exact measurement desired for the finished work, and it is to this degree that the gauge pin 3 must be returned by pressure of the cutting tool thereagainst so as to properly set the tool to perform the degree of cutting desired for the finished work. In other words, the degree of tension under which the projection 9 has been placed before releasing the gauge pin, represents the degree of margin allowed the operator in setting the tool by observance of the hand 8 of the indicator which of course is readily visible during the adjustment of the tool. Then when the tool has been adjusted to the point where the engagement thereof upon the end of the gauge pin 3 causes the hand 8 to turn to zero, the cutting tool is clamped in such position and the entire attachment with the indicator is removed from the work and the cutting operation performed in the regular manner for the removal of the stock A'.

Upon completion of the cutting operation, the operator may apply the present device to the work so as to be re-assured that the finished work has the exact measurement desired. This test may be performed by placing the work upon a suitable base and then placing the bottom surface of the base portion of the attachment upon the top of the work so that the gauge pin may extend along the side thereof and the lower end thereof rest upon the suitable base. If the tension upon the projection 9 through the gauge pin as it engages the base is sufficient to bring the hand 8 to zero upon the dial, then the operator will know that the measurement of the finished work is exact. This test may be performed occasionally as a means of correcting any error due to possible accidental dislodgement of the cutting tool from its proper position during continued operation or as may be due to any other cause.

It is to be understood that the present attachment is intended especially to be employed in the final finishing operation although, of course, it may be employed for the trimming of any degree of stock from the work. Such trimming will be performed by a single operation of the cutting tool.

It is to be understood also that the gauge rods will be ground and lapped especially upon their ends so as to ensure exactness.

The gauge rods of a given set will vary one inch in length and by the use of the several rods of a given set, this attachment may be employed for trimming work to any length, width, or thickness as may be desired, as for instance, from one-thousandth of an inch to two feet or over.

Thus, it will be seen that I have devised a simple, convenient and inexpensive form of attachment which may be employed in connection with the setting of cutting tools of various forms of machines and that as a result, there may be obtained increased accuracy and speed with which the final trimming operation may be performed. This attachment may be manufactured and sold to the workman without involving any modification of the machine in connection with which it is designed to be used. Other uses and advantages will be obvious to those who are familiar with the art to which the present invention relates.

What I claim is:

1. In a device of the class described, the combination of a dial test indicator, a base portion which may bear against the work, a post upon which the indicator is adjustably mounted said post extending from said base portion and gauge means extending through said base portion and provided with means for releasably positioning it in said base portion and in operative engagement with said indicator, said parts being so constructed and arranged that the desired measurement for the work can be visibly indicated as a result of the engagement of the work with said base and gauge means.

2. In a device of the class described, the combination of a dial test indicator, a base portion which may bear against the work, means for adjustably mounting said indicator upon said base portion, gauge means for co-operation with said base portion and with said indicator, and means for releasably positioning said gauge means in connection with said base portion so as to first establish thereupon the proper measurement to be obtained upon the work and then indicate visibly the accomplishment of the same by operative engagement with the indicator.

3. In a device of the class described, a base portion adapted at one side to bear against the work, said base portion having an opening therethrough, a post extending from the opposite side of the base portion, an indicator having an actuating stem adjustably mounted on said post, a gauge pin adapted to extend through said opening in said base portion in registry with the actuating stem of said indicator, and means for clamping the gauge pin in any position desired so as to establish the measurement desired and then permit the same to be registered upon the indicator by operative engagement thereof with said actuating stem.

4. A dial test indicator apparatus comprising a base portion adapted at one side to bear against the work, an indicator, a post extending from the opposite side of the base portion and upon which the indicator is adjustably mounted, said base portion having an aperture through which any one of a set of gauge pins may extend in registry with said indicator, and means for clamping such a gauge pin in any position desired so as to establish the measurement desired and then register the same upon the indicator.

CHARLES R. MORRISON.